(12) United States Patent
Mei et al.

(10) Patent No.: US 11,074,063 B2
(45) Date of Patent: Jul. 27, 2021

(54) AUTOMATIC UPGRADE OF ROBOTIC PROCESS AUTOMATION USING A COMPUTER

(71) Applicant: International Business Machines Corporation, Armonk, NY (US)

(72) Inventors: Lijun Mei, Beijing (CN); Xue Han, Beijing (CN); Qi Cheng Li, Beijing (CN); Ya Bin Dang, Beijing (CN); Lian Xue Hu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/566,064

(22) Filed: Sep. 10, 2019

(65) Prior Publication Data
US 2021/0072969 A1    Mar. 11, 2021

(51) Int. Cl.
*G06F 9/44* (2018.01)
*G06F 8/65* (2018.01)
*G06F 8/38* (2018.01)
*G06F 9/451* (2018.01)

(52) U.S. Cl.
CPC .............. *G06F 8/65* (2013.01); *G06F 8/38* (2013.01); *G06F 9/451* (2018.02)

(58) Field of Classification Search
CPC .............. G06F 8/38; G06F 8/65; G06F 9/451
USPC ......................................................... 717/170
See application file for complete search history.

(56) References Cited

U.S. PATENT DOCUMENTS

| | | | | |
|---|---|---|---|---|
| 9,367,379 | B1* | 6/2016 | Burke | G06F 11/0706 |
| 9,430,356 | B2* | 8/2016 | Gao | G06F 11/3612 |
| 9,904,527 | B1* | 2/2018 | Miller | G06F 8/71 |
| 10,235,192 | B2 | 3/2019 | Hall | |
| 10,452,674 | B2* | 10/2019 | Diwan | G06N 3/006 |
| 10,620,937 | B1* | 4/2020 | Brass | G06F 8/65 |
| 10,802,889 | B1* | 10/2020 | Ganesan | G06F 9/5072 |
| 2009/0217250 | A1* | 8/2009 | Grechanik | G06F 8/36 |
| | | | | 717/136 |

(Continued)

OTHER PUBLICATIONS

Alok Mani Tripathi; "Learning Robotic Process Automation—Create Software robots and automated business processes with the leading RPA tool-UiPath"; Packt>, Birmingham—Mumbai 2018.*

(Continued)

*Primary Examiner* — Francisco J Aponte
(74) *Attorney, Agent, or Firm* — Michael A. Petrocelli

(57) ABSTRACT

Methods, computer program products, and systems for Robotic Process Automation (RPA) upgrade of an application are provided. A first mapping indicating relationships between UI elements in a first version of the application and UI elements in a second version of the application and a second mapping indicating relationships between one or more UI elements in a first version of an RPA code corresponding to the first version of the application and UI elements in the first version of the application are respectively obtained. A third mapping indicating relationships between the one or more UI elements in the second version of the application and one or more UI elements in a second version of the RPA code corresponding to the second version of the application is determined and based on which the second version of the RPA code corresponding to the second version of the application is generated.

20 Claims, 5 Drawing Sheets

(56) References Cited

U.S. PATENT DOCUMENTS

| | | | |
|---|---|---|---|
| 2009/0217302 A1* | 8/2009 | Grechanik | G06F 11/368 |
| | | | 719/320 |
| 2016/0167226 A1* | 6/2016 | Schnittman | G05D 1/0274 |
| | | | 382/153 |
| 2017/0173784 A1 | 6/2017 | Shah | |
| 2017/0228119 A1 | 8/2017 | Hosbettu | |
| 2018/0165264 A1* | 6/2018 | Venkataraman | G06N 20/00 |
| 2019/0057203 A1* | 2/2019 | Buddhiraju | G06F 21/602 |
| 2019/0129824 A1* | 5/2019 | Radhakrishnan | G06F 11/3608 |
| 2019/0155225 A1* | 5/2019 | Kothandaraman | G06N 20/00 |
| 2019/0286474 A1* | 9/2019 | Sturtivant | G06F 9/451 |
| 2019/0324781 A1* | 10/2019 | Ramamurthy | G06N 3/088 |
| 2020/0050983 A1* | 2/2020 | Balasubramanian | |
| | | | G06F 11/3423 |
| 2020/0134374 A1* | 4/2020 | Oros | G06F 8/65 |
| 2020/0147791 A1* | 5/2020 | Safary | G06F 11/0736 |
| 2020/0178209 A1* | 6/2020 | Jin | H04W 36/0055 |
| 2020/0180148 A1* | 6/2020 | S Nanal | G06F 11/0793 |
| 2020/0206920 A1* | 7/2020 | Ma | G06F 11/3476 |
| 2020/0223061 A1* | 7/2020 | Han | B25J 13/06 |
| 2020/0233707 A1* | 7/2020 | Ramamurthy | G06F 8/70 |
| 2020/0262075 A1* | 8/2020 | Geffen | G05B 23/0294 |
| 2020/0306970 A1* | 10/2020 | Latkar | B25J 9/1674 |
| 2020/0311605 A1* | 10/2020 | Hollander | G06F 9/451 |
| 2020/0401431 A1* | 12/2020 | Rashid | G06F 9/45512 |
| 2021/0019157 A1* | 1/2021 | Voicu | G06N 3/08 |

OTHER PUBLICATIONS

Jesse Varis; "Automating Processes in Web-Interfaces With Robotic Process Automation"; Karelia University of Applied Science, Information Technology, Finland—Dec. 2018.*

Chappell, David, "Introducing Blue Prism |Robotic Process Automation for the Enterprise", Copyright © 2017 Chappell & Associates, 22 pages.

Mell et al., "The NIST Definition of Cloud Computing", National Institute of Standards and Technology, Special Publication 800-145, Sep. 2011, 7 pages.

Varis, Jesse, "Automating Processes in Web-Interfaces With Robotic Process Automation", Thesis, Karelia University of Applied Sciences Information Technology, Dec. 2018, 33 pages, <https://www.theseus.fi/bitstream/handle/10024/157753/Jesse_Varis.pdf?sequence=1>.

* cited by examiner

AUTOMATIC UPGRADE OF ROBOTIC PROCESS AUTOMATION USING A COMPUTER

BACKGROUND

The present application relates to computing, and more specifically, to methods, systems and computer program products for Robotic Process Automation (RPA) upgrade.

Robotic Process Automation (RPA), is an emerging form of business process automation technology based on the notion of metaphorical software robots (RPA robots) or artificial intelligence (AI) workers. In traditional workflow automation tools, a software developer produces a list of actions to automate a task and interface to the back-end system using internal application programming interfaces (APIs) or dedicated scripting languages. In contrast, RPA systems develop the action list by watching the user performs that task in the application's graphical user interface (GUI), and then perform the automation by repeating those tasks directly in the GUI. This can lower the barrier to the use of automation in products that might not otherwise feature APIs for this purpose. RPA robots manipulate and communicate with business systems and applications to streamline processes and reduce the burden on human employees. A robotic process automation solution will stand out from other types of automation due to its flexibility and its ability to efficiently integrate workflows across the entire enterprise.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment of the present invention, there is provided a method for Robotic Process Automation (RPA) upgrade for an application. A first mapping indicating relationships between one or more UI elements in a first version of the application and one or more UI elements in a second version of the application and a second mapping indicating relationships between one or more UI elements in a first version of an RPA code corresponding to the first version of the application and the one or more UI elements in the first version of the application are respectively obtained. A third mapping indicating relationships between the one or more UI elements in the second version of the application and one or more UI elements in a second version of the RPA code corresponding to the second version of the application is determined based on the first mapping and the second mapping, and based on the third mapping, the second version of the RPA code is generated.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
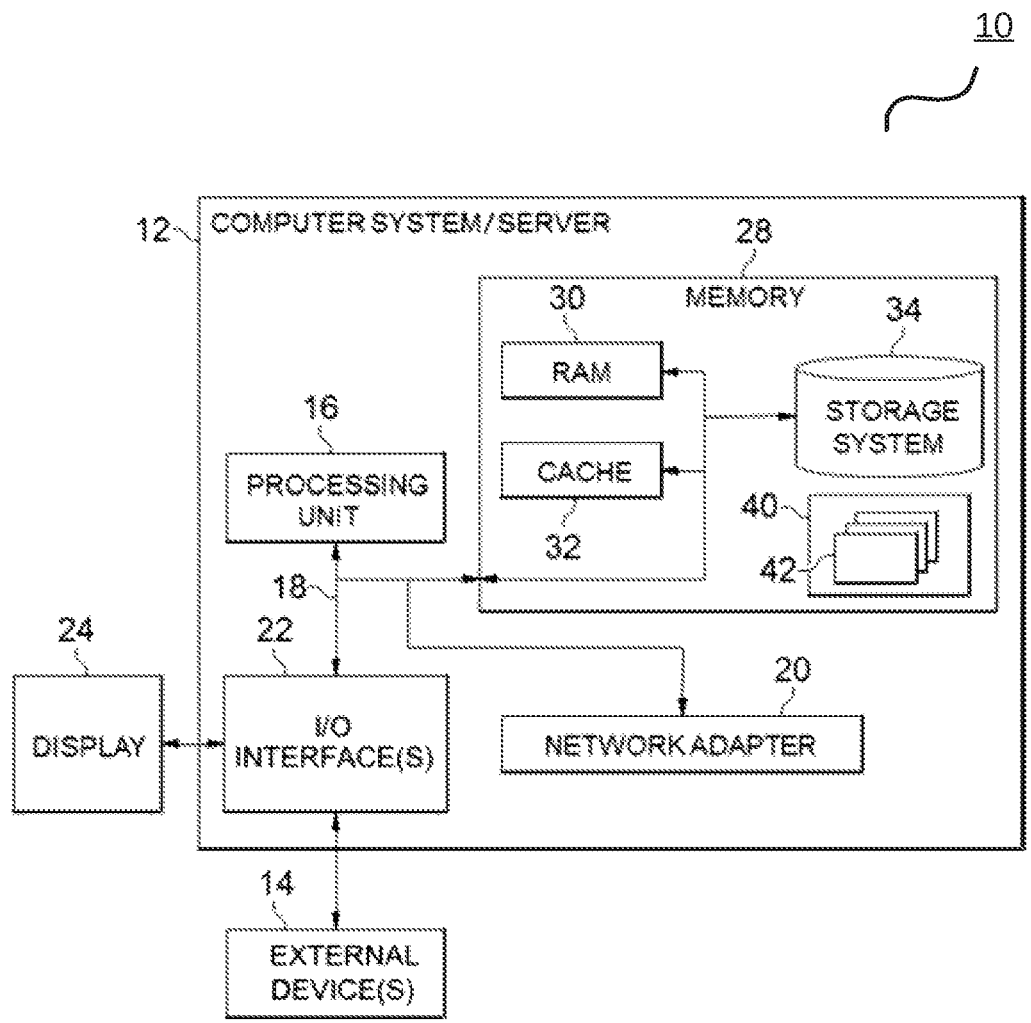
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

Embodiments of the invention are targeting the problems stated out above and can be deployed on cloud computer systems which will be described in the following. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
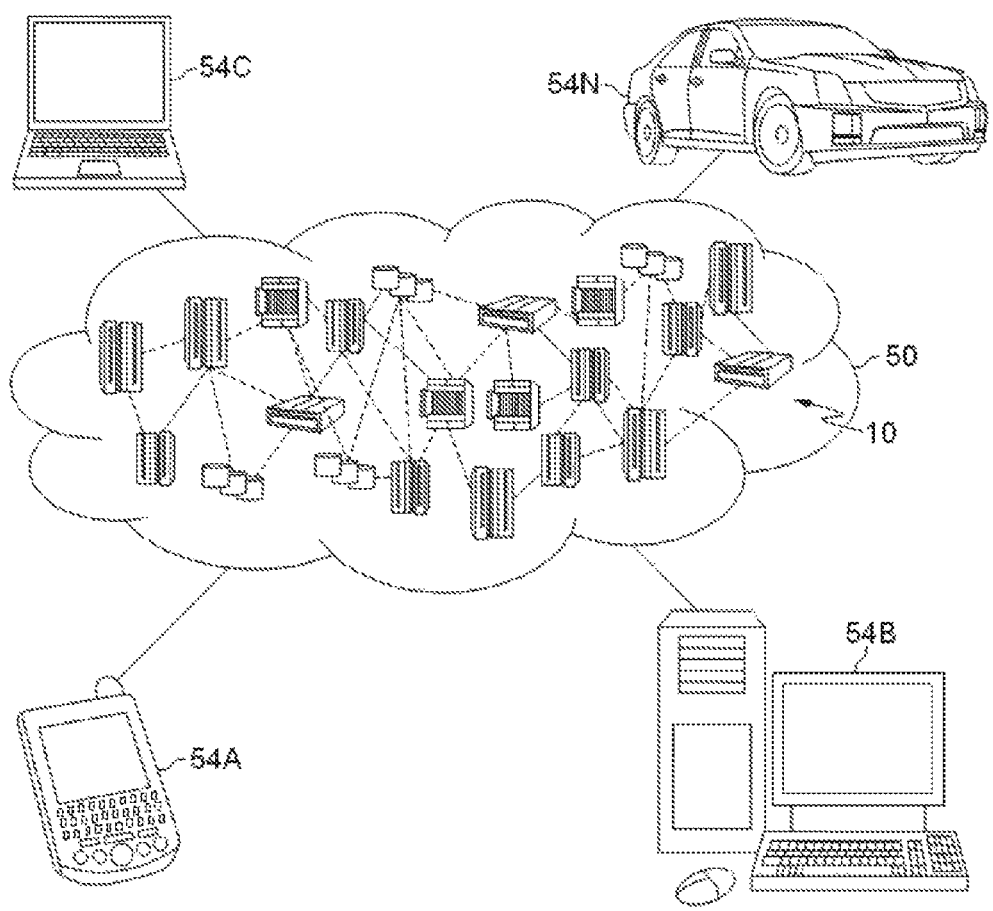
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
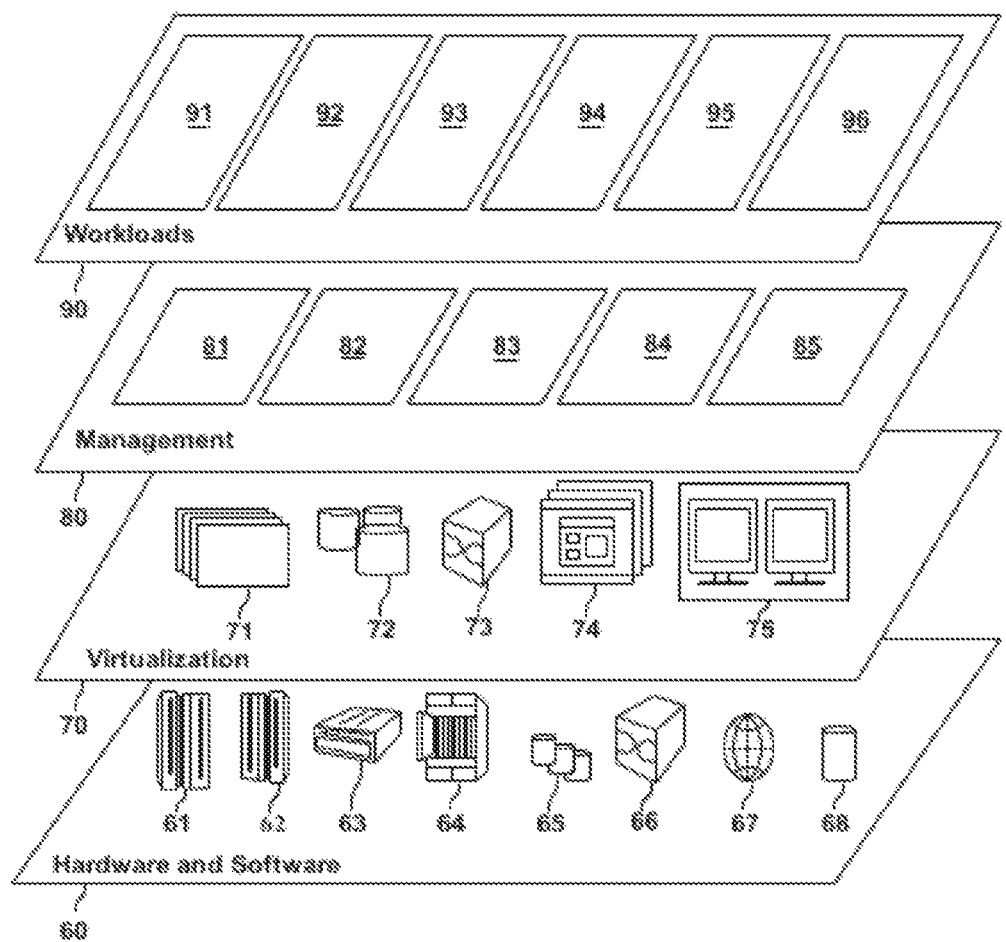
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automatic RPA process upgrade 96 according to embodiments of the invention.

As described in the above, RPA robots manipulate and communicate with business systems and applications to streamline processes, so as to reduce the burden of human employees. RPA code which implementing RPA robots for an application are written by RPA developers, and the corresponding RPA process is built manually. This is a quite time-consuming task and typically needs a lot of efforts, therefore, RPA code are typically written in a manner for the ability of better reusability across variations and different processes. However, the old RPA code corresponding to an old version of the application will fail to operate correctly if a user interface in the old version of the application is changed in an upgraded version of the application after its upgrade, which typically happens quite frequently during large iterations of the application, for example, the name and/or the position of an input box is changed within a page, or the position of an input box is changed to a completely different page. It would be beneficial if RPA code may be upgraded automatically along with the upgrade of the application. However, prior arts fail to provide such kind of approaches.

Embodiments of the present invention are targeting the problem discussed above and provide systems, methods, computer program products for automatic RPA upgrade for an application which will be discussed in detail with references to the accompanying FIGS. 4 to 5.

Figure 4:
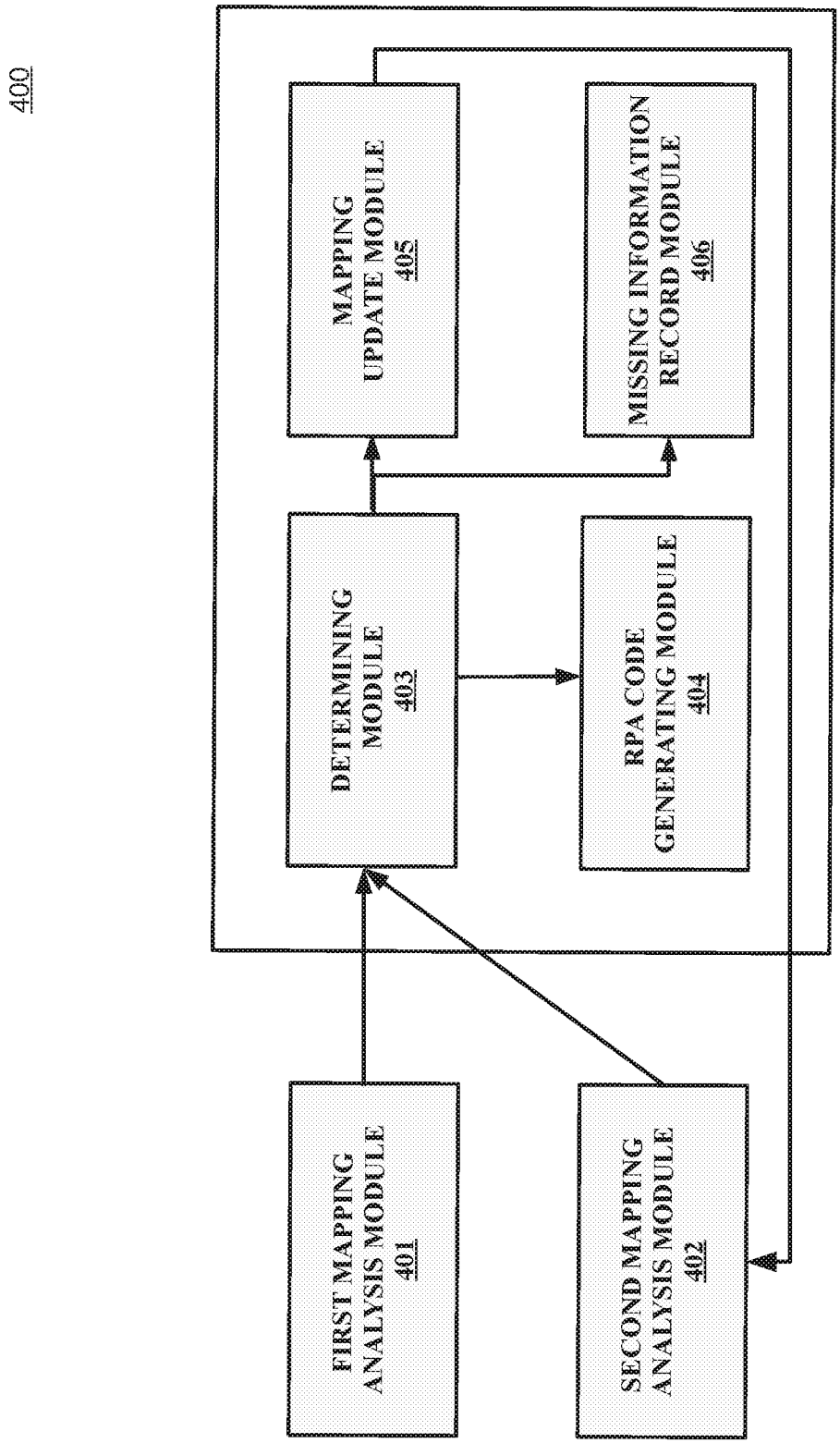
FIG. 4 depicts a block diagram of an exemplary system 400 for automatic RPA upgrade for an application according to an embodiment of the present invention.

Referring now to FIG. 4, in which a block diagram of an exemplary system 400 for automatic RPA upgrade for an application, e.g., a software application, according to an embodiment of the present invention is depicted. The system 400 comprises a first mapping analysis module 401, a second mapping analysis module 402, a determining module 403, an RPA code generation module 404, a mapping update module 405 and optionally a missing information record module 406.

The first mapping analysis module 401 is configured to provide a first mapping indicating relationships among user interface (UI) elements in different versions of an application, e.g. between a first version (an old version) of an application and a second version (an upgraded version) of the application. The first mapping may be provided by an analysis on the source code of different versions of the application, e.g., via a code analysis tool, if the source code of the application is available. If the source code of different versions of the application is not available, however a development change document which records the changes among different versions of the application is available, the first mapping may be provided by an analysis on the development change document. Such analysis may be conducted by any tools that can be easily obtained in existing arts. For example, git is a free and open source distributed version control system and provides a lot of such tools. The development change document may be provided by the developers of the application and stored together with the application, or separately.

The first mapping provided by the first mapping analysis module 401 may be stored in any appropriate data structures, e.g., tables, vectors, etc. In the following, it is illustrated as an example that a data table (Table 1) is utilized to store the first mapping for a certain UI element. As shown, there are four columns in Table 1—UI element ID, version, UI element name and UI element type, however, there may be more or fewer columns, subject to the actual needs. Also, the following table is only for one UI element, there may be respective tables for different UI elements.

TABLE 1

First mapping

| UI Element ID | Version | UI Element Name | UI Element Type |
|---|---|---|---|
| /app/.../000001 | 1.0 | InputUserName | Textbox |
| /app/.../000001 | 1.1 | InputUserName | Textbox |
| /app/.../00001A | 2.0 | InputAccName | Textbox |

As shown in the above, there is shown the first mapping for a UI element in different versions of the application. The UI element in version 1.0 of the application is with an ID '/app/ . . . /00001', a name 'InputUserName' and a type 'Textbox'. The UI element in version 1.1 of the application is with the same ID, the same name and the same type. However, the UI element in version 2.0 of the application is with a new ID '/app/ . . . /00001A' and a new name 'InputAccName', but the same type. Here it should be noted that the above example is merely for the purpose of better understanding and simplified illustration, it should not adversely limit the scope of the invention.

The second mapping analysis module 402 is configured to provide a second mapping indicating relationships between UI elements in a first version of an RPA code corresponding to a version of the application and UI elements in the same version of the application. For example, for a first version (the old version mentioned above) of the application, the second mapping indicates relationships between UI elements in the RPA code corresponding to the first version (the old version mentioned above) of the application and UI elements in the first version (the old version mentioned above) of the application. The second mapping may be provided by an analysis on the corresponding RPA code of the application via an RPA tool, e.g., Blue Prism® tools. Blue Prism® is the trading name of the Blue Prism Group, a UK multinational software corporation that provides RPA services.

The second mapping provided by the second mapping analysis module 402 may be stored in any appropriate data structures, e.g., tables, vectors, etc. In the following, it is illustrated as an example that a data table (Table 2) is utilized to store the second mapping for a certain UI element. As shown, there are four columns in Table 2—UI element ID, version, UI element name and UI element type, however, there may be more or fewer columns, subject to the actual needs. Also, the following table is only for one UI element, there may be respective tables for different UI elements.

TABLE 2

Second mapping

| UI Element ID | Version | UI Element Name | UI Element Type |
|---|---|---|---|
| /app/.../000001 | Application v1.0 | InputUserName | Textbox |
| /app/.../ctxtBTCH | RPA v1.0 | InputUserName | HTML Edit - Text |

As shown in the above, there is shown the mapping for a UI element in the Application v1.0 and RPA v1.0. The UI element in Application v1.0 is with an ID '/app/ . . . /000001', a name 'InputUserName' and a type 'Textbox'. The UI element in the corresponding RPA code of the application—RPA v1.0—is with an ID '/app/ . . . /ctxtBTCH', the same name, and a type 'HTML Edit—Text'. Here it should be noted that the above example is merely for the purpose of better understanding and simplified illustration, it should not adversely limit the scope of the invention.

According to an embodiment of the invention, the first mapping analysis module 401 and the second mapping analysis module 402 may be part of the system 400. According to an embodiment of the invention, the first mapping analysis module 401 and the second mapping analysis module 402 may be coupled to the system 400 via communication links. According to an embodiment of the invention, the first mapping analysis module 401 and the second mapping analysis module 402 may be one module with both the functionalities rather than the two different modules shown in FIG. 4.

The determining module 403 is configured to determine a third mapping indication relationships between UI elements in an upgraded version of the application and UI elements in an upgraded version of the RPA code corresponding to the upgraded version of the application, wherein the upgraded version of the RPA code corresponding to the upgraded version of the application is to be generated. For the example mentioned above with the old version being the first version, and the upgraded version being the second version, the third mapping indicates relationships between UI elements in the second version of the application and UI elements in its corresponding upgraded version of the RPA code. The determination of the third mapping is based on the first mapping (e.g., obtained from the first mapping analysis module 401) and the second mapping (e.g., obtained from the second mapping analysis module 402). The upgraded version of the RPA code corresponding to the second version of the application is to be generated.

The third mapping determined by the determining module 403 based on the first mapping and the second mapping may be stored in any appropriate data structures, e.g., tables, vectors, etc. In the following, it is illustrated as an example that a data table (Table 3) is utilized to store the third mapping for a certain UI element. As shown, there are four columns in Table 3—UI element ID, version, UI element name and UI element type, however, there may be more or fewer columns, subject to the actual needs. Also, the following table is only for one UI element, there may be respective tables for different UI elements.

TABLE 3

Third mapping

| UI Element ID | Version | UI Element Name | UI Element Type |
| --- | --- | --- | --- |
| /app/. . ./00001A | Application v2.0 | InputAccName | Textbox |
| /app/. . ./ctxtBTCH | RPA v2.0 | InputUserName | HTML Edit - Text |

As shown in the above, there is shown the third mapping for a UI element determined based on the first mapping and the second mapping. The UI element in Application v2.0 is with an ID '/app/ . . . /00001A', a name 'InputAccName' and a type 'Textbox'; the corresponding RPA code of the application—RPA v2.0 is with an ID '/app/ . . . /ctxtBTCH', a name 'InputUserName', and a type 'HTML Edit—Text'. Here it should be noted that the above example is merely for the purpose of better understanding and simplified illustration, it should not adversely limit the scope of the invention.

RPA code generating module 404 is configured to generate an upgraded version of the RPA code based on the determined third mapping. For the example, with the upgrade version mentioned above being the second version, an upgraded version of the RPA code corresponding to the second version of the application is generated based on the determined third mapping via a code generation tool, e.g., Blue Prism® tools.

The mapping update module 405 is configured to update the second mapping by replacing it with the third mapping. This is because after the upgraded version of the RPA code corresponding to the upgrade version (the second version in the above example) of the application has been generated, the mapping that indicates relationships between UI elements in the upgraded RPA code corresponding to the upgraded version (the second version) of the application and the same version (the second version) of the application has changed to the third mapping. With the mapping update module 405, the second mapping can be maintained always up to date. In future iterations, the second mapping can be easily obtained directly from the data structure that stores it without the need to conduct further analysis on the RPA code corresponding to the current newest version of the application and the UI elements in the same version of the application.

According to an embodiment of the invention, the mapping update module 405 is also optional. The current newest mapping may be provided by the second mapping analysis module 402 in future iterations.

The optional missing information record module 406 is configured to responsive to a determination that the first mapping indicates a UI element is in the old version (the first version) of the application is missing from the upgraded version (the second version) of the application, record information of the missing UI element in a tracking document. According to an embodiment of the invention, the tracking document may be in any appropriate data structures, e.g., tables, vectors, etc. According to an embodiment of the invention, the record of the information of the missing UI element may be executed responsive to a confirmation to record the information, e.g., from a user. According to an embodiment of the invention, the record of the information of the missing UI element may be executed automatically. With the recorded information in place, if the missing UI elements re-appear in future iterations, their corresponding mappings may be reconstructed easily without a lot effort. According to an embodiment of the invention, information of the missing UI element in the tracking document may be removed responsive to a determination indicating the information is no longer needed.

With the exemplary system 400 described above, even for large iterations of an application in which UI elements are changed, RPA code may be automatically generated. This automatic RPA upgrade does not require user intervention and further reduce the burden of human employees.

Figure 5:
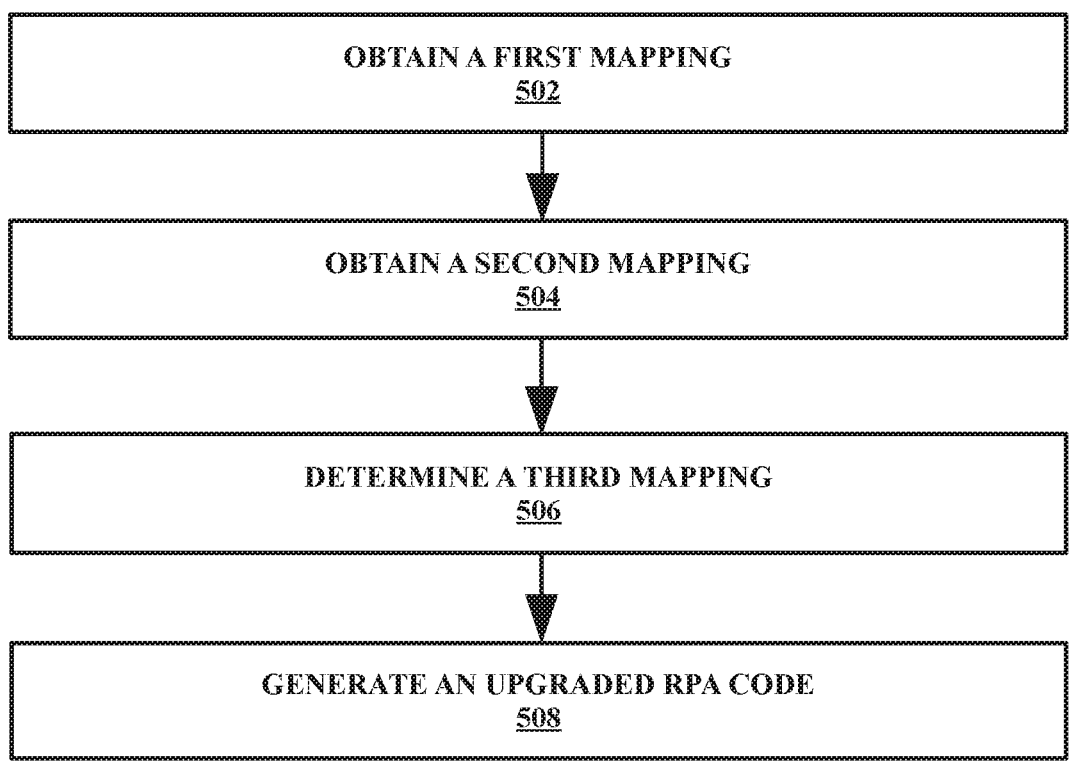
FIG. 5 depicts a flowchart of an exemplary method 500 for automatic RPA upgrade for an application according to an embodiment of the present invention.

Now referring to FIG. 5, in which a flowchart of an exemplary method 500 for automatic RPA upgrade for an application according to an embodiment of the present invention is depicted.

At step 502, a first mapping indicating relationships between UI elements in a first version of an application and UI elements in a second version of the application is obtained. The first mapping may be obtained, for example, by the determining module 403 of system 400 from, for example, the first mapping analysis module 401. The obtaining of the first mapping may comprise obtaining a first code of the first version of the application and obtaining a second code of the second version of the application and analyzing the first code and the second code. The obtaining of the first mapping may comprise obtaining a change document indicating changes between the first version of the application and the second version of the application, and analyzing the change document.

At step 504, a second mapping indicating relationships between UI elements in a first version of an RPA code corresponding to the first version of the application and UI elements in a first version of an application is obtained. The second mapping may be obtained, for example, by the determining module 403 of system 400 from, for example, the second mapping analysis module 402.

At step 506, a third mapping indicating relationships between UI elements in the second version of the application and UI elements in a second version of the RPA code corresponding to the second version of the application is determined based on the obtained first mapping and second mapping. The determination of the third mapping may be conducted, for example, by the determining module 403 of system 400. The second version of the RPA code corresponding to the second version of the application is to be generated.

At step 508, the second version of the RPA code corresponding to the second version of the application is generated. The generation of the second version of the RPA code may be conducted, for example, by the RPA code generating module 404 of system 400.

Optionally, the method 500 may further comprise updating the second mapping by replacing it with the third mapping. Optionally, the method 500 may further comprise responsive to a determination that the first mapping indicates a UI element in the first version of the application is missing from the second version of the application, recording information of the missing UI element in a tracking document. The recording of the information of the missing UI element is executed responsive to a confirmation to record the information. Optionally, the method 500 may further comprise removing information of the missing UI element in the tracking document responsive to a determination indicating the information is no longer needed.

It should be noted that the content rendering according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for Robotic Process Automation (RPA) upgrade for an application, comprising:
   obtaining, by one or more processing units, a first mapping indicating relationships between one or more user interface (UI) elements in a first version of the application and one or more UI elements in a second version of the application;
   obtaining, by one or more processing units, a second mapping indicating relationships between one or more UI elements in a first version of an RPA code corresponding to the first version of the application and the one or more UI elements in the first version of the application;
   determining, by one or more processing units, a third mapping indicating relationships between the one or more UI elements in the second version of the application and one or more UI elements in a second version of the RPA code corresponding to the second version of the application based on the first mapping and the second mapping, wherein an upgraded version of the RPA code is generated which corresponds to the second version of the application;
   generating, by one or more processing units, the second version of the RPA code based on the third mapping; and
   executing automatically the record of the information of a missing UI element, and reconstructing a corresponding mapping using the automatically executed record when the missing UI element re-appears in a future iteration.

2. The computer-implemented method of claim 1, wherein the obtaining of the first mapping comprises:
   obtaining, by one or more processing units, a first code of the first version of the application;
   obtaining, by one or more processing units, a second code of the second version of the application; and
   obtaining, by one or more processing units, the first mapping by analyzing the first code and the second code.

3. The computer-implemented method of claim 1, wherein the obtaining of the first mapping comprises:
   obtaining, by one or more processing units, a change document indicating changes between the first version of the application and the second version of the application; and
   obtaining, by one or more processing units, the first mapping by analyzing the change document.

4. The computer-implemented method of claim 1, further comprising:
   updating, by one or more processing units, the second mapping by replacing it with the third mapping.

5. The computer-implemented method of claim 1, further comprising:
   responsive to a determination that the first mapping indicates a UI element in the first version of the application is missing from the second version of the application, recording, by one or more processing units, information of the missing UI element in a tracking document.

6. The computer-implemented method of claim 5, wherein the recording of the information of the missing UI element is executed responsive to a confirmation to record the information.

7. The computer-implemented method of claim 5, further comprising:
   removing, by one or more processing units, information of the missing UI element in the tracking document responsive to a determination indicating the information is no longer needed.

8. A computer program product for Robotic Process Automation (RPA) upgrade for an application, the computer program product comprising:
   a non-transitory computer readable storage medium having program codes embodied therewith, the program codes executable by a computer and the program codes comprising the following;
   program codes to obtain a first mapping indicating relationships between one or more UI elements in a first version of the application and one or more UI elements in a second version of the application;
   program codes to obtain a second mapping indicating relationships between one or more UI elements in a first version of an RPA code corresponding to the first version of the application and the one or more UI elements in the first version of the application;
   program codes to determine a third mapping indicating relationships between the one or more UI elements in the second version of the application and one or more UI elements in a second version of the RPA code corresponding to the second version of the application based on the first mapping and the second mapping, wherein an upgraded version of the RPA code is generated which corresponds to the second version of the application;
   program codes to generate the second version of the RPA code based on the third mapping; and
   program codes to execute automatically the record of the information of a missing UI element, and program codes to reconstruct a corresponding mapping using the automatically executed record when the missing UI element re-appears in a future iteration.

9. The computer program product of claim 8, wherein the program codes to obtain the first mapping comprises:
- program codes to obtain a first code of the first version of the application;
- program codes to obtain a second code of the second version of the application; and
- program codes to obtain the first mapping by analyzing the first code and the second code.

10. The computer program product of claim 8, wherein the program codes to obtain the first mapping comprises:
- program codes to obtain a change document indicating changes between the first version of the application and the second version of the application; and
- program codes to obtain the first mapping by analyzing the change document.

11. The computer program product of claim 8, further comprising:
- program codes to update the second mapping by replacing it with the third mapping.

12. The computer program product of claim 8, further comprising responsive to a determination that the first mapping indicates a UI element in the first version of the application is missing from the second version of the application:
- program codes to record information of the missing UI element in a tracking document.

13. The computer program product of claim 12, wherein the recording of the information of the missing UI element is executed responsive to a confirmation to record the information.

14. The computer program product of claim 8, further comprising:
- program codes to remove information of the missing UI element in the tracking document responsive to a determination indicating the information is no longer needed.

15. A system for Robotic Process Automation (RPA) upgrade for an application, comprising one or more processors, one or more computer-readable memories, one or more computer-readable tangible storage devices, and program instructions stored on at least one of the one or more storage devices for execution by at least one of the one or more processors via at least one of the one or more memories, the program codes comprising:
- program codes to obtain a first mapping indicating relationships between one or more UI elements in a first version of the application and one or more UI elements in a second version of the application;
- program codes to obtain a second mapping indicating relationships between one or more UI elements in a first version of an RPA code corresponding to the first version of the application and the one or more UI elements in the first version of the application;
- program codes to determine a third mapping indicating relationships between the one or more UI elements in the second version of the application and one or more UI elements in a second version of the RPA code corresponding to the second version of the application based on the first mapping and the second mapping, wherein an upgraded version of the RPA code is generated which corresponds to the second version of the application;
- program codes to generate the second version of the RPA code based on the third mapping; and
- program codes to execute automatically the record of the information of a missing UI element, and program codes to reconstruct a corresponding mapping using the automatically executed record when the missing UI element re-appears in a future iteration.

16. The system of claim 15, wherein the program codes to obtain the first mapping comprises:
- program codes to obtain a first code of the first version of the application;
- program codes to obtain a second code of the second version of the application; and
- program codes to obtain the first mapping by analyzing the first code and the second code.

17. The system of claim 15, wherein the program codes to obtain the first mapping comprises:
- program codes to obtain a change document indicating changes between the first version of the application and the second version of the application; and
- program codes to obtain the first mapping by analyzing the change document.

18. The system of claim 15, further comprising:
- program codes to update the second mapping by replacing it with the third mapping.

19. The system of claim 15, further comprising responsive to a determination that the first mapping indicates a UI element in the first version of the application is missing from the second version of the application:
- program codes to record information of the missing UI element in a tracking document.

20. The system of claim 19, further comprising:
- program codes to remove information of the missing UI element in the tracking document responsive to a determination indicating the information is no longer needed.

* * * * *